(12) United States Patent
Kim et al.

(10) Patent No.: US 9,377,229 B2
(45) Date of Patent: Jun. 28, 2016

(54) BROADBAND HEAT PUMP SYSTEM

(75) Inventors: Minsung Kim, Daejeon (KR);
Young-Jin Baik, Daejeon (KR);
Seong-Ryong Park, Daejeon (KR);
Ho-Sang Ra, Daejeon (KR); Young-Soo Lee, Seoul (KR); Ki-Chang Chang, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 389 days.

(21) Appl. No.: 13/980,699

(22) PCT Filed: Aug. 8, 2012

(86) PCT No.: PCT/KR2012/006309
§ 371 (c)(1),
(2), (4) Date: Jul. 19, 2013

(87) PCT Pub. No.: WO2013/062218
PCT Pub. Date: May 2, 2013

(65) Prior Publication Data
US 2014/0041406 A1     Feb. 13, 2014

(30) Foreign Application Priority Data
Oct. 27, 2011 (KR) .................. 10-2011-0110234

(51) Int. Cl.
*F25B 17/00* (2006.01)
*F25B 49/00* (2006.01)
(Continued)

(52) U.S. Cl.
CPC . *F25B 49/00* (2013.01); *F24D 3/18* (2013.01); *F24D 12/02* (2013.01); *F24D 19/1039* (2013.01); *F25B 30/00* (2013.01); *F25B 2400/06* (2013.01); *Y02B 30/14* (2013.01)

(58) Field of Classification Search
CPC ............ F25B 30/00; F25B 30/06; F24D 3/18; F24D 17/02; Y02B 30/12; Y02B 30/14; Y02B 30/765; Y02B 10/70
See application file for complete search history.

(56) References Cited

U.S. PATENT DOCUMENTS

2007/0205298 A1* 9/2007 Harrison ............. F24D 11/0221 237/2 B
2010/0108290 A1* 5/2010 Maxwell ................... F24D 3/10 165/62

FOREIGN PATENT DOCUMENTS

DE    20-2006-009538 U1    10/2006
JP         07-139847 A      6/1995
(Continued)

OTHER PUBLICATIONS

International Search Report for PCT/KR2012/006309 mailed Jan. 22, 2013 from Korean Intellectual Property Office.
(Continued)

*Primary Examiner* — Jonathan Bradford
*Assistant Examiner* — Elizabeth Martin
(74) *Attorney, Agent, or Firm* — Paratus Law Group, PLLC

(57) ABSTRACT

Provided is a broadband heat pump system including: a heat pump module including a plurality of heat pumps that supply hot water with different levels of temperature; a heat source supply module that introduces a heat source from one heat source or selectively introduces a heat source from one or a plurality of heat sources among heat sources with different levels of temperature so as to produce a heat source with a desired temperature; and a controller that controls the heat pump module and the heat source supply module to select one from the plurality of heat pumps to be appropriate to a temperature of hot water requested by a demand source and to receive a heat source with a necessary temperature from the heat source supply module so that the selected heat pump is able to supply hot water with the requested temperature.

7 Claims, 3 Drawing Sheets

(51) Int. Cl.
*F24D 3/18* (2006.01)
*F25B 30/00* (2006.01)
*F24D 12/02* (2006.01)
*F24D 19/10* (2006.01)

(56) References Cited

FOREIGN PATENT DOCUMENTS

| KR | 10-0780281 | B1 | 11/2007 |
| KR | 10-0893828 | B1 | 4/2009 |
| WO | WO 2010/145040 | A1 | 12/2010 |

OTHER PUBLICATIONS

European Search Report for EP Application No. 12 843 268.9 mailed Feb. 18, 2015 from European Patent Office.
European Search Report for EP Application No. 12 843 268.9 mailed May 11, 2015 from European Patent Office.

* cited by examiner

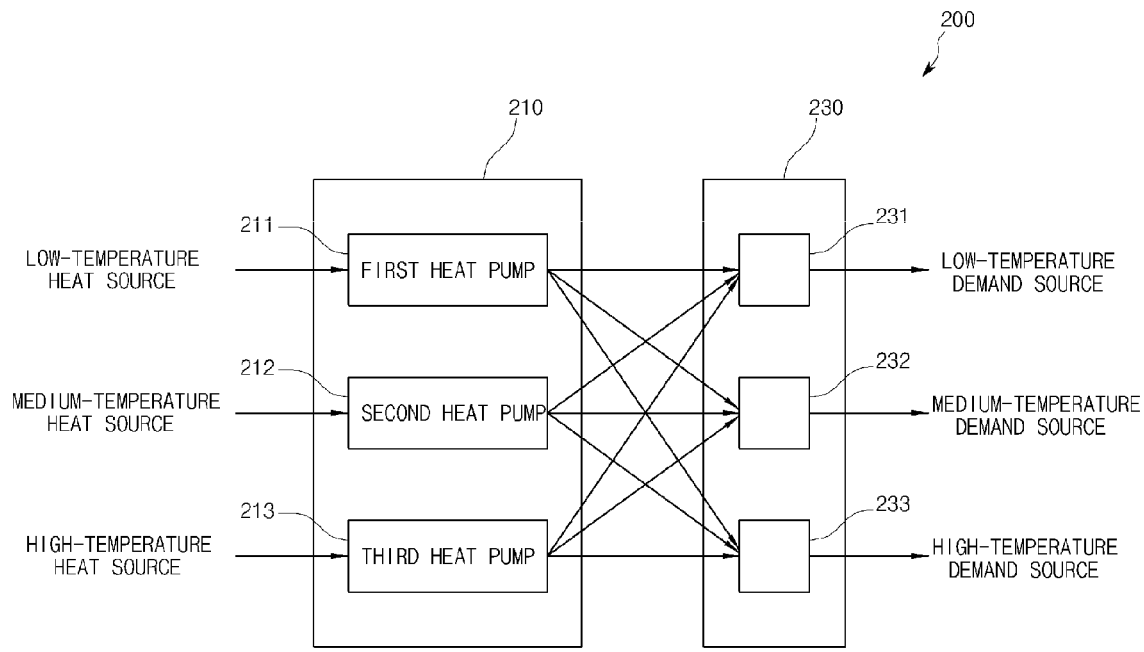
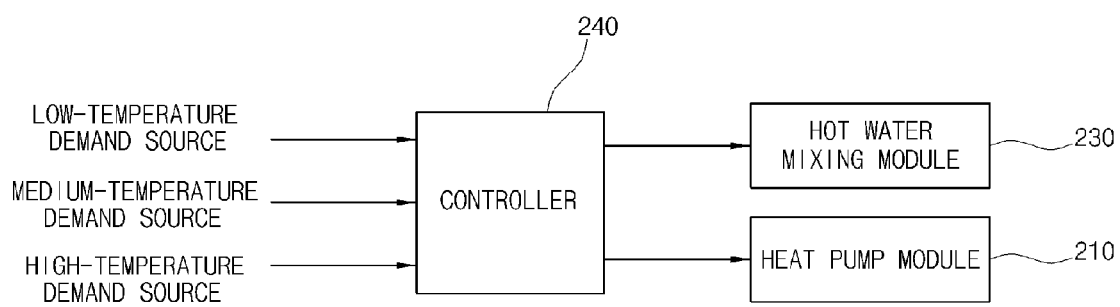

BROADBAND HEAT PUMP SYSTEM

CROSS REFERENCE TO PRIOR APPLICATION

This application is a National stage Patent Application of PCT International Patent Application No. PCT/KR2012/006309 (filed on Aug. 8, 2012) under 35 U.S.C. §371, which claims priority to Korean Patent Application No. 10-2011-0110234 (filed on Oct. 27, 2011), which are all hereby incorporated by reference in their entirety.

TECHNICAL FIELD

The present invention relates to a broadband heat pump system, and more particularly, to a broadband heat pump system that is capable of supplying hot water with various levels of temperature to a desired demand source using heat sources with various levels of temperature.

BACKGROUND ART

Heat pumps are devices that is capable of producing hot water with a high temperature using a heat source with a low temperature. In general, heat pumps produce hot water with a set temperature and a set flow rate using a heat source that is introduced with a predetermined temperature and a predetermined flow rate.

In a new renewable heat source, such as a geothermal heat source, a sewage heat source, a solar heat source, and a river water heat source, the temperature of the heat source is not constant, and flow rate (or heat flow) characteristics change significantly. In addition, in reality, a demand source that uses hot water requires hot water with various levels of temperature depending on the purpose of demand. However, there are limitations in satisfying characteristics of the heat source and characteristics of the demand source using general heat pumps.

Korean Patent Registration No. 0780281 discloses a technique for supplying hot water to a demand source by operating a heat pump using fresh water, river water, and the like. However, in such a technique, a plurality of heat pumps are simply installed in parallel and operate. It is difficult to efficiently use heat sources with various levels of temperature and to meet the requirement of a demand source that requires hot water with various levels of temperature.

DETAILED DESCRIPTION OF THE INVENTION

Technical Problem

The present invention provides a broadband heat pump system that is capable of supplying hot water with various levels of temperature to a desired demand source using heat sources with various levels of temperature.

Technical Solution

According to an aspect of the present invention, there is provided a broadband heat pump system including: a heat pump module including a plurality of heat pumps that supply hot water with different levels of temperature; a heat source supply module that introduces a heat source from one heat source or selectively introduces a heat source from one or a plurality of heat sources among heat sources with different levels of temperature so as to produce a heat source with a desired temperature; and a controller that controls the heat pump module and the heat source supply module to select one from the plurality of heat pumps to be appropriate to a temperature of hot water requested by a demand source and to receive a heat source with a necessary temperature from the heat source supply module so that the selected heat pump is able to supply hot water with the requested temperature.

According to another aspect of the present invention, there is provided a broadband heat pump system including: a heat pump module including a plurality of heat pumps that supply hot water with different levels of temperature; one or a plurality of heat sources supplying a heat source to each of the plurality of heat pumps; a hot water mixing module with different levels of temperature and including a plurality of hot water mixers that allow hot water to be selectively introduced from one or a plurality of heat pumps among the plurality of heat pumps and mix the introduced hot water; and a controller that controls the heat pump module and the hot water mixing module to select one from the plurality of hot water mixtures to be appropriate to a temperature of hot water requested by a demand source and to receive hot water from one or a plurality of heat pumps among the plurality of heat pumps so that the selected hot water mixer is able to supply hot water with the requested temperature.

According to another aspect of the present invention, there is provided a broadband heat pump system including: a heat pump module including a plurality of heat pumps that supply hot water with different levels of temperature; a heat source supply module including a plurality of heat source mixers that allow hot water to be selectively introduced from one or a plurality of heat sources among heat sources with different levels of temperature and mix the introduced hot water; a hot water mixing module with different levels of temperature and including a plurality of hot water mixers that allow hot water to be selectively introduced from one or a plurality of heat pumps among the plurality of heat pumps and mix the introduced hot water; and a controller that controls the heat pump module, the heat source supply module, and the hot water mixing module to select one hot water mixer and one heat source mixer from the plurality of hot water mixtures and the plurality of heat source mixers, to select one or a plurality of heat pumps among the plurality of heat pumps corresponding to the selected hot water mixer and to select one or a plurality of heat sources among the plurality of heat sources corresponding to the selected heat source mixer to be appropriate to a temperature of hot water requested by a demand source so that the selected hot water mixer, the selected heat source mixer, the selected heat pump, and the selected heat source are able to be supplied to the demand source.

Advantageous Effects

A broadband heat pump system according to the present invention has the following effects.

First, hot water with various levels of temperature can be supplied to a desired demand source.

Second, since heat sources with various levels of temperature including a new renewable energy source can be used, energy availability increases.

DESCRIPTION OF THE DRAWINGS

FIG. 3 is a view schematically illustrating a broadband heat pump system according to another embodiment of the present invention;

FIG. 4 is a block diagram illustrating a control flow of the broadband heat pump system of FIG. 3;

BEST MODE OF THE INVENTION

Figure 1:
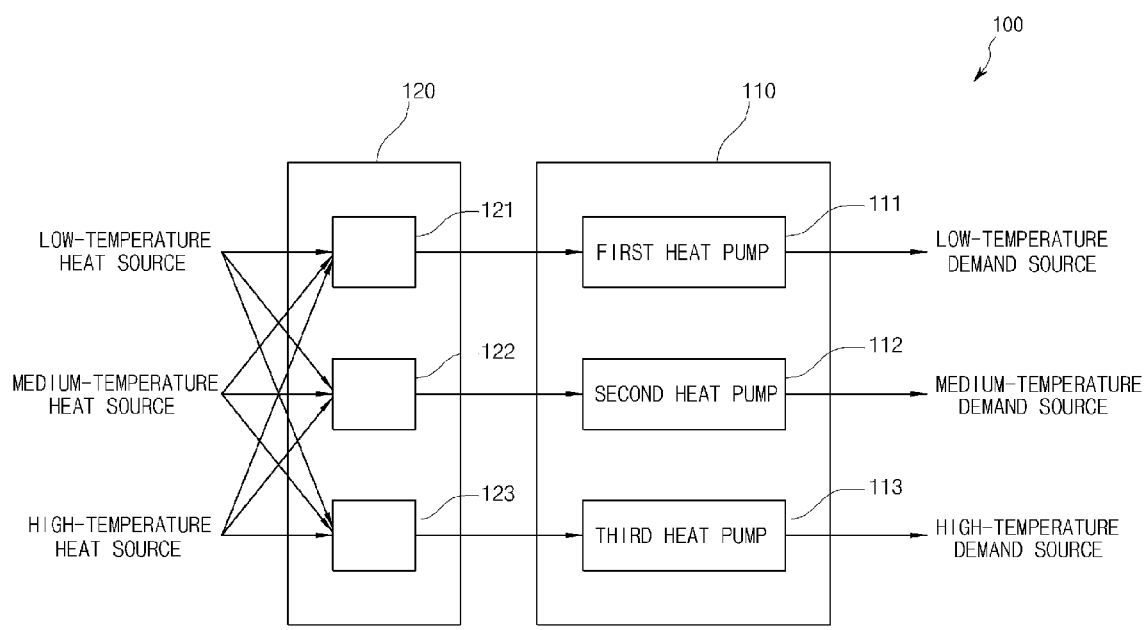
FIG. 1 is a view schematically illustrating a broadband heat pump system according to an embodiment of the present invention.
Figure 2:
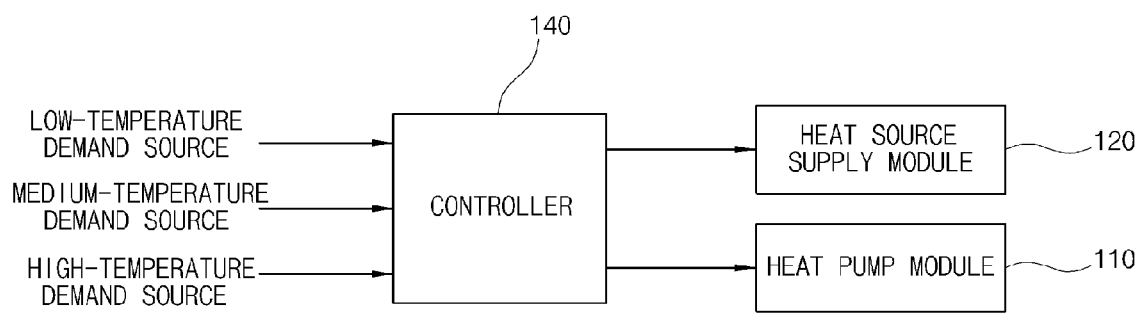
FIG. 2 is a block diagram illustrating a control flow of the broadband heat pump system illustrated in FIG. 1.

A broadband heat pump system 100 according to an embodiment of the present invention is shown in FIGS. 1 and 2. The broadband heat pump system 100 includes a heat pump module 110, a heat source supply module 120, and a controller 140.

The heat pump module 110 includes a first heat pump 111, a second heat pump 112, and a third heat pump 113, which supply hot water with different levels of temperature. The third heat pump 113 supplies hot water with the highest temperature, and the first heat pump 111 supplies hot water with the lowest temperature. In the present invention, the term "hot water" does not simply mean only water with a high temperature but means various heat mediums except for water. Furthermore, the term "hot water" is a concept that includes not only a heat medium with a high temperature but also a low-temperature heat medium, such as cold water or the like.

Even when the third heat pump 113 supplies hot water with the highest temperature, a heat source with the highest temperature need not to be supplied to the third heat pump 113. The first, second, and third heat pumps 111, 112, and 113 can produce hot water with various levels of temperature using heat sources with various levels of temperature depending on structures and characteristics of a refrigerant.

Heat sources with various levels of temperature are used to be used in the first, second, and third heat pumps 111, 112, and 113. For example, a geothermal temperature difference heat source is generally at 10 to 20° C., a fuel cell heat source is at 80° C., and a solar heat source is 50 to 250° C. However, the solar heat source has thermal efficiency that increases as temperature is lowered, and does not prefer to use high heat due to durability caused by high heat. That is, heat sources with various levels of temperature and various levels of heat flow, such as a geothermal heat source, a sewage heat source, a solar heat source, a river water heat source, a fuel cell heat source, and the like, are used as a low-temperature heat source, a medium-temperature heat source, and a high-temperature heat source. In the present specification, the low-temperature heat source, the medium-temperature heat source, and the high-temperature heat source do not have predetermined levels of temperature but are used in a relative sense.

However, the heat source supply module 120 is not limited to the above description. That is, the heat source supply module 120 may be one from among the low-temperature heat source, the medium-temperature heat source, and the high-temperature heat source and may use air heat as well as geothermal heat and sewage heat. That is, the first, second, and third heat pumps 111, 112, and 113 need to produce hot water with various levels of temperature using an air heat source.

The heat source supply module 120 includes first, second, and third heat source mixers 121, 122, and 123. The first heat source mixer 121 receives one or a plurality of heat sources from the low-temperature heat source, the medium-temperature heat source, and the high-temperature heat source and supplies the received heat source or heat sources to the first heat pump 111 as a heat source or heat sources. The second heat source mixer 122 receives one or a plurality of heat sources from the low-temperature heat source, the medium-temperature heat source, and the high-temperature heat source and supplies the received heat source or heat sources to the second heat pump 112 as a heat source or heat sources. In addition, the third heat source mixer 123 receives one or a plurality of heat sources from the low-temperature heat source, the medium-temperature heat source, and the high-temperature heat source and supplies the received heat source or heat sources to the third heat pump 113 as a heat source or heat sources.

A demand source is classified into a low-temperature demand source, a medium-temperature demand source, and a high-temperature demand source. In the present specification, the low-temperature demand source, the medium-temperature demand source, and the high-temperature demand source do not have predetermined levels of temperature but are used in a relative sense.

The low-temperature demand source receives low-temperature hot water from the first heat pump 111, the medium-temperature demand source receives medium-temperature hot water from the second heat pump 112, and the high-temperature demand source receives high-temperature hot water from the third heat pump 113.

The controller 140 controls the heat pump module 110 and the heat source supply module 120 to be appropriate to temperature levels of hot water requested by the low-temperature demand source, the medium-temperature demand source, and the high-temperature demand source. For example, when the low-temperature demand source requests hot water with a predetermined temperature, the controller 140 controls the heat pump module 110 and the heat source supply module 120 to receive heat sources from the low-temperature heat source, the medium-temperature heat source, and the high-temperature heat source, to produce a heat source with a set temperature (or a set level of temperature), and to supply the produced heat source to the first heat pump 111. In this case, the heat source supply module 120 produces a heat source to be supplied to the first heat pump 111 in consideration of factors, such as substantial temperature levels, levels of heat flow, and possible provision time zones of the low-temperature heat source, the medium-temperature heat source, and the high-temperature heat source. Medium-temperature hot water and high-temperature hot water to be supplied to the medium-temperature demand source and the high-temperature demand source are controlled in a similar manner to the above manner.

As described above, since heat sources with various levels of temperature can be used depending on various demand sources' needs, energy availability is improved.

A broadband heat pump system 200 according to another embodiment of the present invention is shown in FIGS. 3 and 4. Hereinafter, differences between FIGS. 3 and 4 and FIGS. 1 and 2 will be described.

The broadband heat pump system 200 includes a heat pump module 210, a hot water mixing module 230, and a controller 240. The heat pump module 210 includes a first heat pump 211, a second heat pump 212, and a third heat pump 213, which supply hot water with different levels of temperature.

Heat sources with various levels of temperature are used to be used in the first, second, and third heat pumps 211, 212, and 213. A low-temperature heat source is supplied to the first heat pump 211, a medium-temperature heat source is supplied to the second heat pump 212, and a high-temperature heat source is supplied to the third heat pump 213.

The hot water mixing module 230 includes a low-temperature hot water mixer 231, a medium-temperature hot water mixer 232, and a high-temperature hot water mixer 233. The low-temperature hot water mixer 231 allows hot water to be selectively introduced from one or a plurality of the first, second, and third heat pumps 211, 212, and 213 and mixes the introduced hot water. The medium-temperature hot water mixer 232 allows hot water to be selectively introduced from one or a plurality of the first, second, and third heat pumps 211, 212, and 213 and mixes the introduced hot water. The high-temperature hot water mixer 233 allows hot water to be selectively introduced from one or a plurality of the first, second, and third heat pumps 211, 212, and 213 and mixes the introduced hot water.

A demand source is classified into a low-temperature demand source, a medium-temperature demand source, and a high-temperature demand source. The low-temperature demand source receives low-temperature hot water from the low-temperature hot water mixer 231, the medium-temperature demand source receives medium-temperature hot water from the medium-temperature hot water mixer 232, and the high-temperature demand source receives high-temperature hot water from the high-temperature hot water mixer 233.

The controller 240 controls the heat pump module 210 and the heat source supply module 230 to be appropriate to temperature levels of hot water requested by the low-temperature demand source, the medium-temperature demand source, and the high-temperature demand source. For example, when the low-temperature demand source requests hot water with a predetermined temperature, the controller 240 controls the heat pump module 210 and the heat source supply module 230 to select a heat pump to operate from the first, second, and third heat pumps 211, 212, and 213. If all of the first, second, and third heat pumps 211, 212 and 213 are required, the controller 240 controls the heat pump module 210 and the heat source supply module 230 to respectively supply the low-temperature heat source, the medium-temperature heat source, and the high-temperature heat source to the first heat pump 211, the second heat pump 212, and the third heat pump 213.

The low-temperature hot water mixer 231 receives hot water with set levels of temperature and set levels of flow from the first heat pump 211, the second heat pump 212, and the third heat pump 213, produces hot water with a temperature requested by the low-temperature demand source and then supplies the produced hot water to the low-temperature demand source. Medium-temperature hot water and high-temperature hot water to be supplied to the medium-temperature demand source and the high-temperature demand source are controlled in a similar manner to the above manner.

Figure 5:
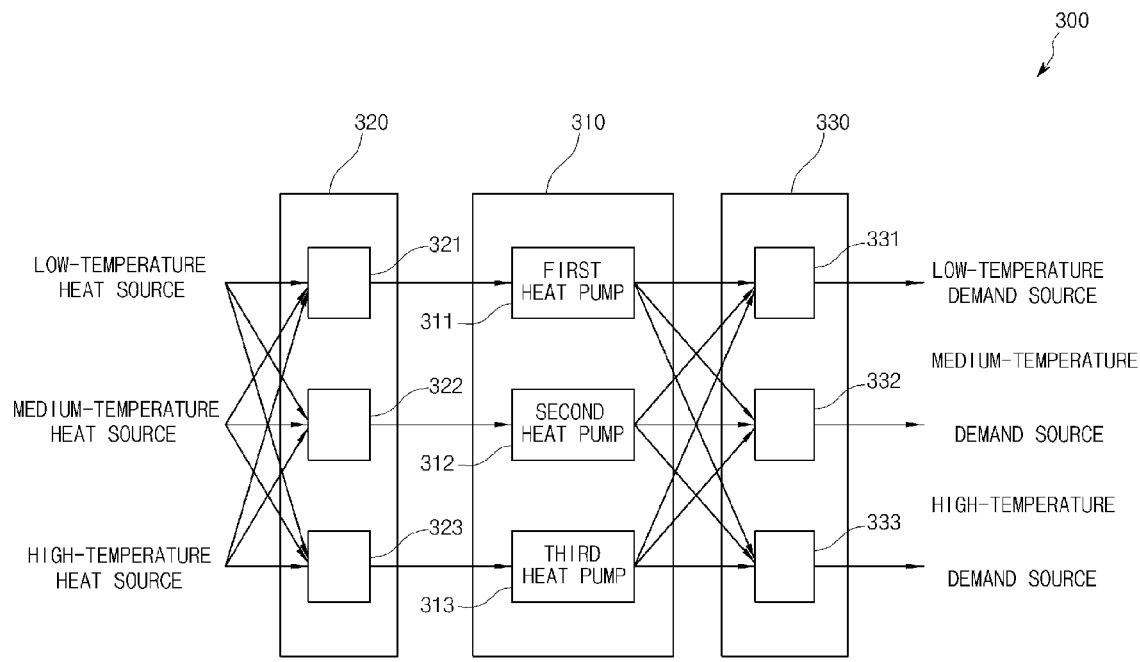
FIG. 5 is a view schematically illustrating a broadband heat pump system according to another embodiment of the present invention.
Figure 6:
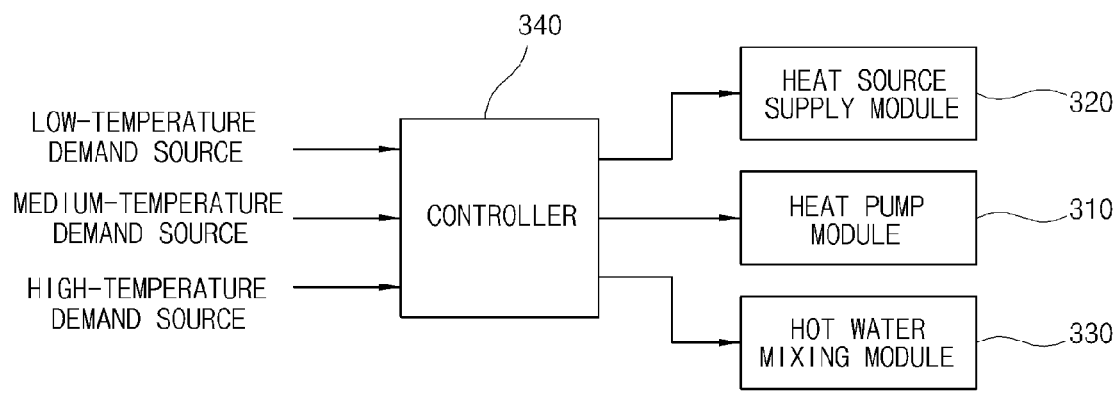
FIG. 6 is a block diagram illustrating a control flow of the broadband heat pump system of FIG. 5.

A broadband heat pump system 300 according to another embodiment of the present invention is shown in FIGS. 5 and 6. Hereinafter, differences between FIGS. 5 and 6, FIGS. 1 and 2 and FIGS. 3 and 4 will be described.

The broadband heat pump system 300 includes a heat pump module 310, a heat source supply module 320, a hot water mixing module 330, and a controller 340. The heat pump module 310 includes a first heat pump 311, a second heat pump 312, and a third heat pump 313, which supply hot water with different levels of temperature.

The heat source supply module 320 includes first, second, and third heat source mixers 321, 322, and 323. The first heat source mixer 321 receives one or a plurality of heat sources from a low-temperature heat source, a medium-temperature heat source, and a high-temperature heat source and supplies the received heat source or heat sources to the first heat pump 311 as a heat source or heat sources. The second heat source mixer 322 receives one or a plurality of heat sources from the low-temperature heat source, the medium-temperature heat source, and the high-temperature heat source and supplies the received heat source or heat sources to the second heat pump 312 as a heat source or heat sources. In addition, the third heat source mixer 323 receives one or a plurality of heat sources from the low-temperature heat source, the medium-temperature heat source, and the high-temperature heat source and supplies the received heat source or heat sources to the third heat pump 313 as a heat source or heat sources.

The hot water mixing module 330 includes a low-temperature hot water mixer 331, a medium-temperature hot water mixer 332, and a high-temperature hot water mixer 333. The low-temperature hot water mixer 331 allows hot water to be selectively introduced from one or a plurality of the first, second, and third heat pumps 311, 312, and 313 and mixes the introduced hot water. The medium-temperature hot water mixer 332 allows hot water to be selectively introduced from one or a plurality of the first, second, and third heat pumps 311, 312, and 313 and mixes the introduced hot water. The high-temperature hot water mixer 333 allows hot water to be selectively introduced from one or a plurality of the first, second, and third heat pumps 311, 312, and 313 and mixes the introduced hot water.

A demand source is classified into a low-temperature demand source, a medium-temperature demand source, and a high-temperature demand source. The low-temperature demand source receives low-temperature hot water from the low-temperature hot water mixer 331, the medium-temperature demand source receives medium-temperature hot water from the medium-temperature hot water mixer 332, and the high-temperature demand source receives high-temperature hot water from the high-temperature hot water mixer 333.

The controller 340 controls the heat source supply module 320, the heat pump module 310, and the heat source supply module 330 to be appropriate to temperature levels of hot water requested by the low-temperature, medium-temperature, and high-temperature demand sources. For example, when the low-temperature demand source requests hot water with a predetermined temperature, the controller 340 controls the heat source supply module 320, the heat pump module 310, and the heat source supply module 330 to select a heat pump to operate from the first, second, and third heat pumps 311, 312, and 313. If all of the first, second, and third heat pumps 311, 312 and 313 are required, the controller 340 controls the heat source supply module 320, the heat pump module 310, and the heat source supply module 330 to operate all of the low-temperature heat source mixer 321, the medium-temperature heat source mixer 322, and the high-temperature heat source mixer 323. Each of the low-temperature heat source mixer 321, the medium-temperature heat source mixer 322, and the high-temperature heat source mixer 323 produces a requested heat source and supplies the produced heat source to each of the first, second, and third heat pumps 311, 312, and 313.

The low-temperature hot water mixer 331 receives hot water with set levels of temperature and set levels of flow from the first heat pump 311, the second heat pump 312, and the third heat pump 313, produces hot water with a temperature requested by the low-temperature demand source and then supplies the produced hot water to the low-temperature demand source. Medium-temperature hot water and high-temperature hot water to be supplied to the medium-temperature demand source and the high-temperature demand source are controlled in a similar manner to the above manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

By using a broadband heat pump system according to the present invention, plants can be designed to target a demand source that requires hot water with various levels of temperature.

The invention claimed is:

1. A heat pump system comprising:
   a plurality of heat sources with different levels of temperature;
   a heat pump module comprising a plurality of heat pumps that supply hot water with different levels of temperature, wherein each heat pump receives only a heat source with a fixed temperature and the fixed temperatures of the heat sources received at the plurality of heat pumps are different from each other;
   a heat source supply module comprising a plurality of heat source mixers that receive the heat source from at least one of the plurality of heat sources, wherein each heat source mixer produces only the heat source with the fixed temperature dedicated to each heat pump and the fixed temperatures of the heat sources produced at the plurality of heat source mixers are different from each other, wherein each heat source mixer is connected to only one of the heat pumps to supply the dedicated heat source with the fixed temperature and is not connected to remaining heat pumps, and each heat pump is connected to only one of the heat source mixers to receive the dedicated heat source with the fixed temperature and is not connected to remaining heat source mixer;
   a hot water mixing module with different levels of temperature and comprising a plurality of hot water mixers that allow hot water to be selectively introduced from at least one of the plurality of heat pumps and mix the introduced hot water, wherein each hot water mixer is connected to each heat pump which is connected to a single heat source mixer among the plurality of heat source mixers and mixes the introduced hot water, wherein each hot water mixer is connected to a single demand source among a plurality of demand sources and supplies the mixed water to the connected single demand source; and
   a controller that controls the heat pump module, the heat source supply module, and the hot water mixing module to select one hot water mixer and one heat source mixer from the plurality of hot water mixtures and the plurality of heat source mixers, to select one or a plurality of heat pumps among the plurality of heat pumps corresponding to the selected hot water mixer and to select one or a plurality of heat sources among the plurality of heat sources corresponding to the selected heat source mixer to be appropriate to a temperature of hot water requested by a demand source among the plurality of demand sources so that the selected hot water mixer, the selected heat source mixer, the selected heat pump, and the selected heat source are able to supply temperature controlled hot water to the demand source.

2. The heat pump system of claim 1, wherein the plurality of heat pumps comprise a first heat pump, a second heat pump, and a third heat pump as temperature levels increase.

3. The heat pump system of claim 2, wherein the plurality of demand sources comprise a low-temperature demand source, a medium-temperature demand source, and a high-temperature demand source,
   the hot water mixers comprise a low-temperature hot water mixer, a medium-temperature hot water mixer, and a high-temperature hot water mixer, and
   the heat source mixers comprise a low-temperature heat source mixer, a medium-temperature heat source mixer, and a high-temperature heat source mixer.

4. The heat pump system of claim 1, wherein the heat source supply module selects the heat source in consideration of at least one from among substantial temperature levels, levels of heat flow, and provision time zones of the plurality of heat sources.

5. The heat pump system of claim 3, wherein the low-temperature heat source mixer supplies a low-temperature heat source only to the first heat pump,
   the medium-temperature heat source mixer supplies a medium-temperature heat source only to the second heat pump, and
   the high-temperature heat source mixer supplies a high-temperature heat source only to the third heat pump.

6. The heat pump system of claim 1, wherein the plurality of heat pumps simultaneously receive the heat sources with the different fixed temperatures, respectively.

7. The heat pump system of claim 1, wherein the plurality of heat source mixers simultaneously produce the heat sources with the different fixed temperatures, respectively.

* * * * *